United States Patent [19]
Lupien et al.

[11] Patent Number: 5,839,070
[45] Date of Patent: Nov. 17, 1998

[54] SYSTEM AND METHOD FOR HYPERBAND CELL INTEROPERABILITY IN A CELLULAR TELECOMMUNICATIONS NETWORK

[75] Inventors: Francis Lupien; Richard Brunner, both of Montreal, Canada

[73] Assignee: Telefonaktiebolaget LM Ericsson (publ), Stockholm, Sweden

[21] Appl. No.: 542,879

[22] Filed: Oct. 13, 1995

[51] Int. Cl.⁶ ....................................................... H04Q 7/22
[52] U.S. Cl. .......................... 455/440; 455/443; 455/444; 455/454
[58] Field of Search ..................................... 455/422, 436, 455/437, 438, 439, 440, 441, 442, 443, 444, 450, 451, 62, 67.1, 426; 370/331, 332

[56] References Cited

U.S. PATENT DOCUMENTS

| | | | |
|---|---|---|---|
| 5,042,082 | 8/1991 | Dallin | 455/437 |
| 5,260,988 | 11/1993 | Schellinger et al. | 379/59 |
| 5,406,615 | 4/1995 | Miller, II et al. | 379/59 |
| 5,432,843 | 7/1995 | Bonta | 455/437 |
| 5,491,834 | 2/1996 | Chia | 455/444 |
| 5,506,887 | 4/1996 | Emery et al. | 455/422 |
| 5,517,675 | 5/1996 | O'Connor et al. | 455/437 |

OTHER PUBLICATIONS

Enrico Del Re et al.; "The GSM Procedures in an Integrated Cellular/Satelite System"; *IEEE Journal on Selected Areas in Communications;* vol. 13, No. 2, Feb. 13, 1995; pp. 421–430.

Ph. Duplessis, P. et al.; "Towards a Conbined GSM 900 DCS 1800 System"; *Proceedings of the 5th Nordic Seminar on Digital Mobile Radio Communications;* Dec. 1–3, 1992, pp. 89–92.

*Primary Examiner*—Thanh Cong Le
*Attorney, Agent, or Firm*—Steven W. Smith

[57] ABSTRACT

A system for providing seamless interoperability for a multi-hyperband capable mobile station roaming between cells within a cellular telecommunications network having a mobile switching center and a plurality of base stations that transmit and receive radio signals in a plurality of frequency hyperbands. The system comprises a plurality of location and verification devices within each of the plurality of base stations, Each of the plurality of location and verification devices operates in a different one of the plurality of frequency hyperbands. The system builds a neighbor list of candidate cells for handoff that includes cells operating in different ones of the plurality of frequency hyperbands, identifies the best candidate cell for communication with the mobile station, and verifies the presence of the mobile station in the identified candidate cell.

45 Claims, 4 Drawing Sheets

SYSTEM AND METHOD FOR HYPERBAND CELL INTEROPERABILITY IN A CELLULAR TELECOMMUNICATIONS NETWORK

CROSS REFERENCE TO RELATED APPLICATION

This application is related to co-owned and co-pending U.S. patent application Ser. No. 08/543,022, titled "Cellular Telecommunications Nework Having Seamless Interoperability Between Exchanges While Supporting Operation in Multiple Frequency Hyperbands," filed concurrently herewith and hereby incorporated by reference as if quoted in its entirety herein.

BACKGROUND OF THE INVENTION

1. Technical Field of the Invention

This invention relates to cellular telecommunications networks and, more particularly, to a system and method of providing interoperability between cells controlled by a single mobile switching center and operating on different frequency hyperbands in a cellular telecommunications network.

2. Description of Related Art

North American cellular telecommunications networks traditionally operate in two frequency bands (A and B) in the 800-MHz hyperband, and are extending into C, D, and other bands. The most recent evolution in cellular telecommunications involves the adoption of six additional frequency bands (A–F) in the 1900-MHz hyperband for use in handling mobile and personal communications. The 1900-MHz hyperband is also known as the Personal Communication Services (PCS) hyperband. Frequency bands within the 800-MHz hyperband and the 1900-MHz hyperband are defined in EIA/TIA Standard IS-136 and the PN3388-1 and PN3388-2 Specifications, which are hereby incorporated by reference herein. Other standards which define cellular telephone operations in North America include EIA-627, EIA-553, and the intersystem signaling standard IS-41 which are also incorporated by reference herein.

Each of the frequency bands specified for the cellular and PCS hyperbands is allocated a plurality of voice or speech channels and at least one access or control channel. The control channel is used to control or supervise the operation of mobile stations by means of information transmitted to and received from the mobile stations. Such information may include, but is not limited to, incoming call signals, outgoing call signals, page signals, page response signals, location registration signals, voice channel assignments, maintenance instructions, short message service (SMS) messages, and cell selection or reselection instructions as mobile stations travel out of the radio coverage of one cell and into the radio coverage of another cell. The voice channel is used to carry subscriber telephonic communications as well as messages requesting mobile station assistance in making hand-off evaluations. The control and voice channels may operate in either an analog mode or a digital mode.

Existing cellular telephone networks may simultaneously support radio telecommunications in multiple frequency hyperbands. For example, a mobile switching center (MSC) may control transmission and reception equipment at a base station to operate one cell in the 800-MHz hyperband and another cell in the 1900-MHz hyperband. The key to this dual operation is that 800-MHz cells are operated separately from 1900-MHz cells. It would be advantageous to have a cellular telecommunications network capable of controlling overlapping or adjacent cells in different hyperbands in such a way that mobile stations capable of operating in multiple hyperbands may operate seamlessly between cells operating in different hyperbands.

Cell planning in hyperband cellular telecommunications networks is based on propagation characteristics. Radio waves propagate more efficiently at 800 MHz than they do at 1900 MHz. Therefore, for a given transmitted signal strength level, and utilizing equivalent received signal strength levels to define the boundaries of the cells, a 800-MHz cell has a larger cell radius than a 1900-MHz cell. This physical limitation causes severe cell-planning problems. For example, it may be desirable to have a combination cell that transmits on both 800 MHz and 1900 MHz. However, due to the different propagation characteristics at the different frequencies, the cell is a different size for each frequency. A planner is faced with either (1) defining different operating parameters for the 800-MHz equipment and the 1900-MHz equipment in order to try to equalize the physical size of the 800-MHz cells and the 1900-MHz cells; or (2) operating at the same parameters and accepting the different physical size limitations. The network will then either have gaps in the 1900-MHz service area or require additional 1900-MHz base stations. In cells operating on multiple hyperbands, it becomes increasingly critical that a network's mobile switching center (MSC) have the capability to perform mobile station locating and presence verification in each supported hyperband in order to provide seamless interoperability for mobile stations operating in areas of multi-hyperband cells.

Another proposed solution to the cell planning problem is to provide a hyperband (e.g., 1900-MHz) cellular system as a complete overlay to the existing 800-MHz cellular system. This solution, however, requires a totally separate network infrastructure and is not a cost effective solution.

Although there are no known prior art teachings of a solution to the aforementioned deficiency and shortcoming such as that disclosed herein, a number of prior art references exist that discuss subject matter that bears some relation to matters discussed herein. Such prior art references are U.S. Pat. Nos. 5,260,988 to Schellinger et al. and 5,406,615 to Miller, II et al. Each of these references is discussed briefly below.

U.S. Pat. No. 5,260,988 to Schellinger et al. (Schellinger) discloses a dual mode cellular/cordless radiotelephone capable of operating on both a cellular frequency band and a cordless telephone frequency band. When operating in the cellular mode, the Schellinger telephone monitors the signal quality from the cordless base station and preferentially selects the cordless base station over the cellular system when the signal quality of the cordless base station exceeds a predetermined value. Schellinger, however, does not teach or suggest a system or method for operating a mobile switching center in a cellular telecommunications network on multiple hyperbands and providing seamless interoperability for mobile stations roaming between multi-hyperband capable cells.

U.S. Pat. No. 5,406,615 to Miller, II et al. (Miller) also discloses a dual mode cellular/cordless radiotelephone capable of operating on both a cellular frequency band and a cordless telephone frequency band. Upon initial power on, the Miller telephone attempts to establish cordless telephone service. If unable, the Miller telephone switches to cellular service. The use of the cordless base station is reassessed following the expiration of a timer or if the received cellular signal strength falls below a predetermined threshold. Miller, however, does not teach or suggest a system or method for operating a mobile switching center in a cellular telecommunications network on multiple hyperbands and providing seamless interoperability for mobile stations roaming between multi-hyperband capable cells.

Review of each of the foregoing references reveals no disclosure or suggestion of a system or method such as that described and claimed herein.

It would be a distinct advantage to have a cellular telecommunciations network in which mobile switching centers are capable of operating cells on multiple frequency hyperbands, and in which seamless interoperability for mobile stations roaming between multi-hyperband capable cells is provided. Such a network would provide support for the functions of mobile station locating, presence verification, cell reselection, and handoff of mobile stations on multiple frequency hyperbands without requiring the complete overlay of separate hyperband cellular networks. It is an object of the present invention to provide such a cellular telecommunications network.

SUMMARY OF THE INVENTION

In one aspect, the present invention is a system for providing seamless interoperability for a mobile station roaming between cells within a cellular telecommunications network having a mobile switching center and a plurality of base stations that transmit and receive radio signals in a plurality of frequency hyperbands. The system may be implemented with a plurality of hyperband-specific location and verification devices that operate in a different one of the plurality of frequency hyperbands, or with a single location and verification device capable of performing signal strength measurements in a plurality of hyperbands. The location and verification devices may be implemented within each of the plurality of base stations. The system also includes means for building a neighbor list of candidate cells for handoff that includes cells operating in different ones of the plurality of frequency hyperbands, and means for determining the best candidate cell for communication with the mobile station.

In another aspect, the present invention is a method of providing seamless interoperability for a mobile station roaming between cells within a cellular telecommunications network having a mobile switching center and a plurality of base stations that transmit and receive radio signals in a plurality of frequency hyperbands. The method comprises the steps of operating a plurality of location and verification devices within each of the plurality of base stations, each of the plurality of location and verification devices having a signal strength receiver and operating in a different one of the plurality of frequency hyperbands. The method includes building a neighbor list of candidate cells for handoff that includes cells operating in different ones of the plurality of frequency hyperbands. This is followed by identifying the best candidate cell for communication with the mobile station, determining whether the mobile station is in the best candidate cell, and handing off the mobile station to the best candidate cell upon determining that the mobile station is in the best candidate cell.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

Figure 1:
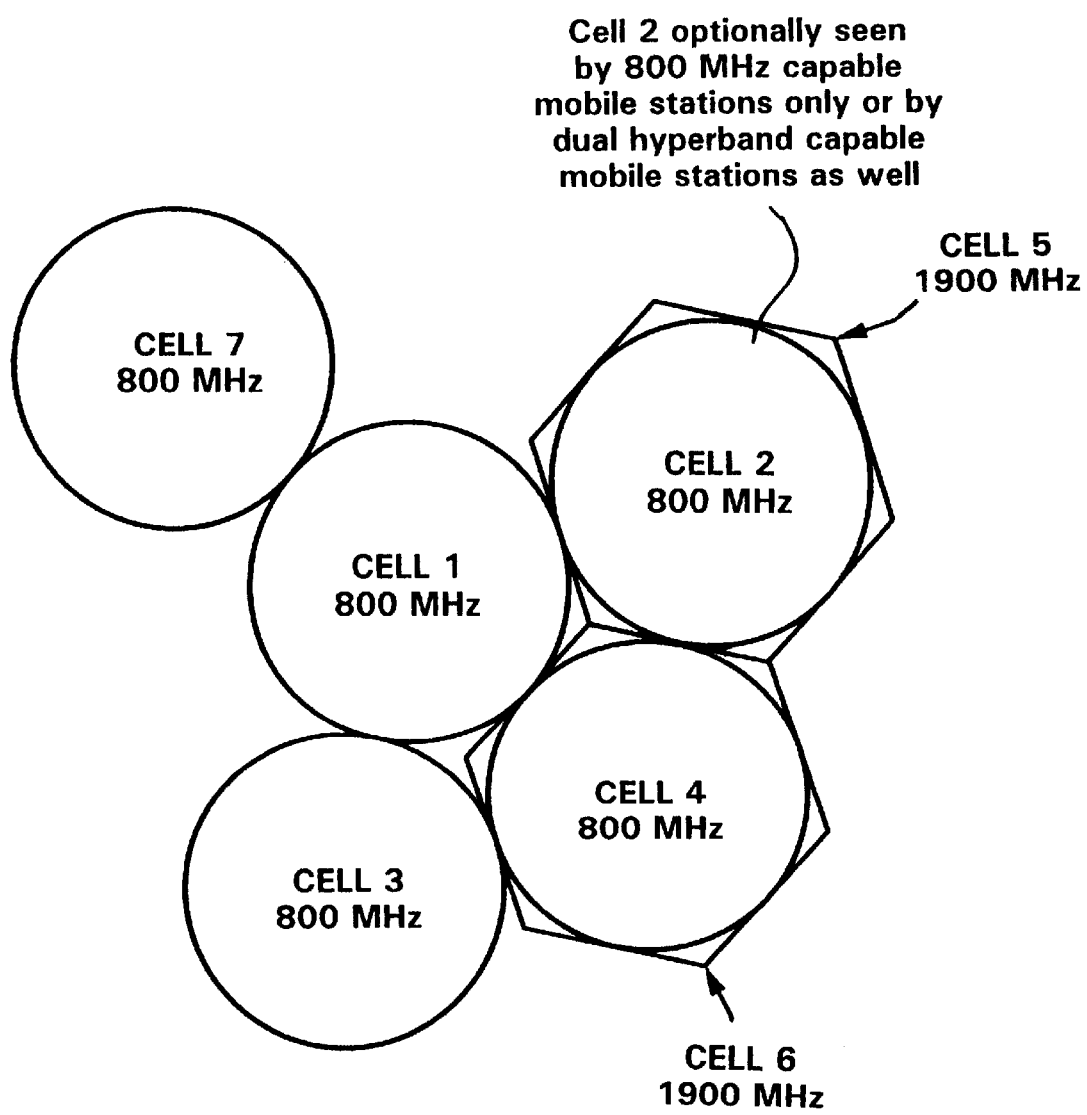
FIG. 1 is an illustrative drawing of a portion of a cellular telephone network showing a plurality of cells operating in different frequency hyperbands.

For purposes of the description herein, seamless interoperability is defined as the capability to perform mobile station Location, Presence Verification, and Handoff of a multi-hyperband capable mobile station, and to support cell reselection as the mobile station moves from cell to cell within the service area of a multi-hyperband cellular telecommunications network. The preferred embodiment of the present invention is described as a Time Division Multiple Access (TDMA) system operating in the 800-MHz and 1900-MHz hyperbands.

Seamless interoperability for mobile stations roaming throughout a multi-hyperband cellular telecommunications network requires that each mobile station and base station have complete neighbor cell information, and that each base station have a device capable of measuring signal strengths in each frequency hyperband supported by a mobile station's serving cell and surrounding neighbor cells.

Complete neighbor cell information is provided by the present invention through the use of logical cell entities within the network's mobile switching centers (MSCs). Within the cellular telecommunications network of the present invention, a cell may be viewed as both a physical entity and a logical entity. As a physical entity, a cell is a radius of coverage around a radio base station in which mobile stations may communicate with the network. Within a MSC, however, the cell is a logical entity. Information concerning the operation of the radio base station and the physical cell is stored as cell parameters or "attributes" of the logical cell entity. These attributes may include, for example, operating frequency bands, digital control channels, analog control channels, transmitted signal strength, etc. The logical cell entity is then utilized in the network of the present invention to build other logical entities comprising a plurality of logical cell entities. Other logical entities may include, for example, location areas, paging areas, and neighbor lists for handoff and cell reselection. Some of the parameters or attributes of the cell move with the logical cell entity and are inherited by the larger entities that the cell is utilized to build, thereby defining the attributes of the larger entities.

Because of the problems associated with combination cells which transmit simultaneously on multiple frequency hyperbands, it is advantageous to keep cells in one hyperband independent of cells operating in other hyperbands. For example, in an embodiment of the present invention comprising 800-MHz cells and 1900-MHz cells, the 800-MHz and 1900-MHz cells independently co-exist within a single MSC, and seamless interoperability is provided between the cells. The present invention utilizes logical cell entities as building blocks for a cellular radio network to operate and provide support for such functions as Location, Presence Verification, Cell Reselection, and Handoff between a serving cell and neighbor cells operating in both the 800-MHz hyperband and the 1900-MHz hyperband. The present invention enables the radio network to provide multi-hyperband capable mobile stations (e.g., mobile stations capable of operating at both 800 MHz and 1900 MHz) with information about neighbor cells for cell selection during a call, at handoff, or for cell reselection.

FIG. 1 is an illustrative drawing of a portion of a cellular telephone network showing a plurality of cells operating in different frequency hyperbands. An arbitrary geographic area (hereinafter "the service area") is divided into a plurality of cells 1–7 utilizing both the 800-MHz Cellular and 1900-MHz PCS hyperbands. Cells 1–4 and 7 are represented by circles and comprise communications cells wherein as many as two separate frequency bands (A and B) of radio frequency cellular communications are provided via multiple channels in the 800-MHz Cellular hyperband. Cells 5 and 6, on the other hand, are represented by hexagons and comprise communications cells wherein as many as six separate frequency bands (A through F) of radio frequency cellular communications are provided to mobile stations via multiple channels in the 1900-MHz PCS hyperband. Cell 2, as a logical entity in the MSC, may be configured with an attribute that enables cell 2 to be "seen" only by 800-MHz capable mobile stations or by both 800-MHz capable mobile stations and dual-hyperband capable mobile stations. In other words, cell 2 may be included in the neighbor list only for mobile stations capable of operating only in the 800-MHz hyperband. Alternatively, a network operator may choose to include cell 2 in the neighbor list sent to dual capable mobile stations as well. This feature enables the operator to tailor the services and coverage provided to different groups of subscribers.

Each of the 800-MHz cells includes at least one base station configured to facilitate communications over certain channels in at least one of the two available Cellular hyperband frequency bands. Similarly, each of the 1900-MHz cells includes either a separate PCS base station or separate 1900-MHz equipment at a cellular base station configured to facilitate communications over certain channels in at least one of the six available PCS hyperband frequency bands. It will, of course, be understood that each cell may include more than one base station, if needed, as different cellular communication service companies may share the same coverage area in different frequency hyperbands.

The base stations may be positionally located at or near the center of each of the cells and utilize omni-directional antennas to transmit and receive radio signals. However, depending on geography and other known factors, the base stations may instead be located at or near the periphery of, or otherwise away from the centers of, each of the cells. In such instances, the base stations may broadcast and communicate with mobile stations located within the cells using directional rather than omni-directional antennas. The base stations are connected, generally by cables, fiber optics, or microwave links, to a mobile switching center (MSC) (not shown).

A number of mobile stations may operate within the service area of the system of the present invention. Some percentage of these mobile stations may possess the requisite functionality for operating in both the Cellular hyperband and the PCS hyperband (i.e., they are multiple hyperband communications capable), while some percentage are capable of communications only in the 800-MHz frequency hyperband or the 1900-MHz frequency hyperband. It will, of course, be understood that mobile stations capable of communications only in the 800-MHz frequency hyperband are compatible with the system of the present invention, but are only able to communicate within 800-MHz cells. Similarly, mobile stations capable of communications only in the 1900-MHz frequency hyperband are compatible with the system of the present invention, but are only able to communicate within 1900-MHz cells.

As the mobile stations move within the service area, there are instances when a mobile station passes from one cell to another of the cells. In moving from one cell to another, the mobile station exchanges information and orders with the base stations and the MSC, and has an opportunity through either cell reselection or hand-off to change the base station through which cellular radio communications are being provided. By moving between cells and changing base stations, the mobile station may also change the hyperband over which communications are being provided.

Figure 2:
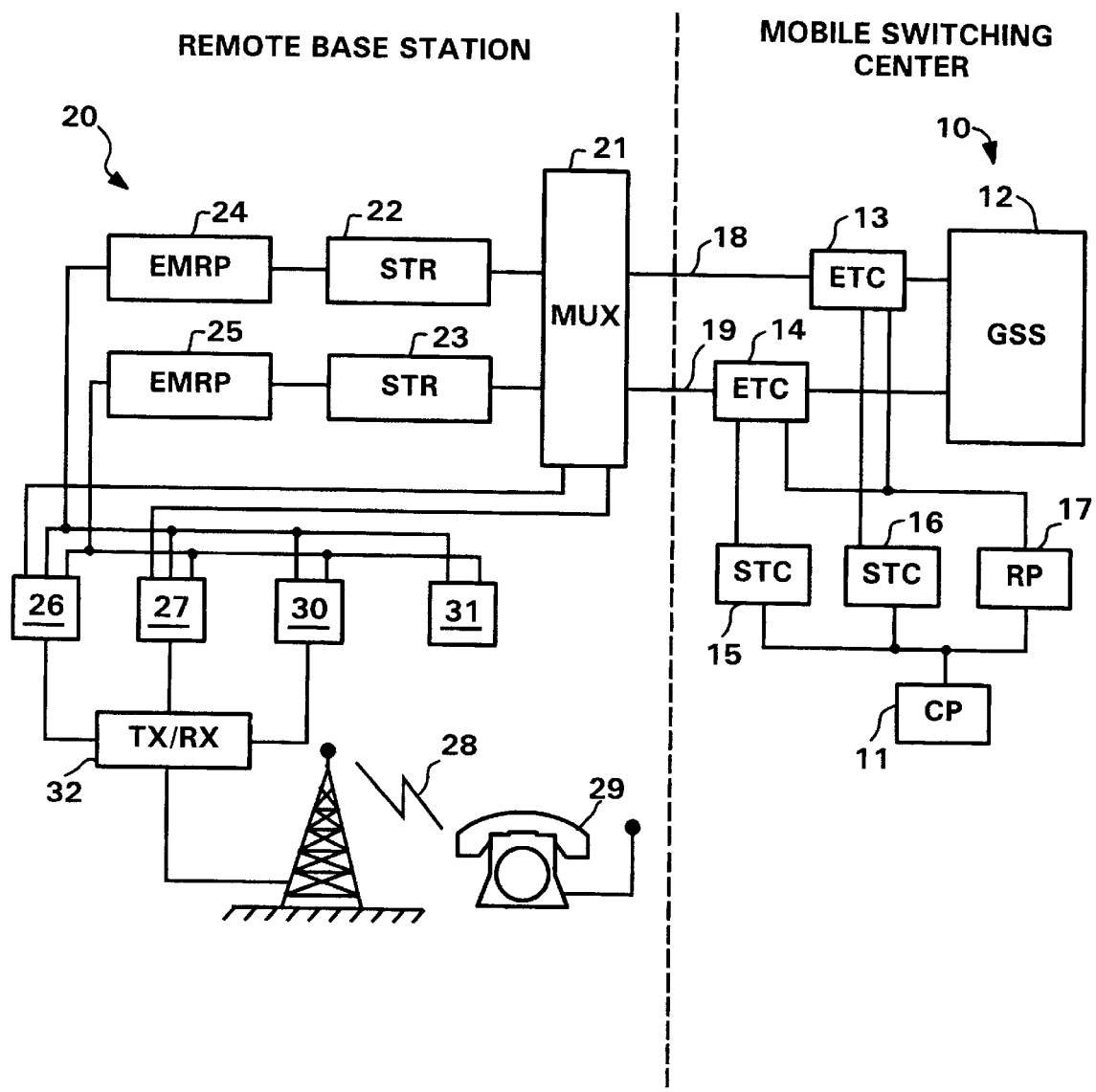
FIG. 2 (Prior art) is a high level block diagram of a portion of an existing cellular telecommunications network including a mobile switching center and a remote base station.

Referring now to FIG. 2, there is shown a block diagram of a portion of an existing cellular telecommunications network including a mobile switching center (MSC) 10 and a remote base station 20 which is suitable for implementing the preferred embodiment of the present invention. It should be understood that this configuration of a MSC and a remote base station is shown by way of example only, and other MSC and base station configurations may also be utilized with the present invention. The MSC 10 includes a central processor 11, a group switching subsystem 12, exchange terminal circuits 13 and 14, and signaling terminals (central) 15 and 16. The MSC may also include a regional processor 17. Communications links 18 and 19 connect the MSC 10 to the remote base station 20. The signaling terminals (central) 15 and 16 are provided in the MSC 10 to connect the central processor 11 to each of the exchange terminal circuits 13 and 14. One signaling terminal (central) is provided for each communications link 18 and 19 extending between the MSC 10 and the remote base station 20 that is to be used by the network for common channel carrying of processor signaling message communications. The signaling terminals (central) 15 and 16 process and format processor signaling messages output from the central processor 11 into the proper format for transmission over the communications links 18 and 19. The exchange terminal circuits 13 and 14 then insert the formatted messages through time division multiplexing into the communications links 18 and 19 for transmission to the remote base station 20.

In the remote base station 20, the communications links 18 and 19 with the MSC 10 are connected to a multiplexer 21. The processor signaling messages carried on the communications links 18 and 19 for the common channel signaling system are then connected to signaling terminals (remote) 22 and 23 which are further connected to extension module regional processors 24 and 25. The multiplexer 21 extracts the formatted processor signaling messages from the communications links 18 and 19, and the connected signaling terminals (remote) 22 and 23 process and reformat the processor signaling messages for output to the extension module regional processors 24 and 25.

The subscriber communications carried on the communications links 18 and 19, on the other hand, are connected from the multiplexer 21 to a plurality of voice channel circuits 26 and 27 for facilitating subscriber communications over a wireless communications link 28 using mobile stations 29. The extension module regional processors 24 and 25 are also connected to the voice channel circuits 26 and 27, and are further connected to a control channel circuit 30 for facilitating the use of well known control message communications over the wireless link 28 between the base station 20 and the mobile stations 29. A signal strength receiver module 31, also connected to the extension module regional processors 24 and 25, is provided for monitoring the signal strength of the communications effectuated over the wireless link 28 between the base station 20 and the mobile stations 29.

The voice channel circuits 26 and 27, and the control channel circuit 30, are connected to a transmitter/receiver and filter which may be, for example, an auto-tune combiner (ATC) 32. In networks providing both 800-MHz and 1900-MHz service, all the transmission equipment in each base station is either uniquely 800-MHz or uniquely 1900-MHz equipment.

Figure 3:
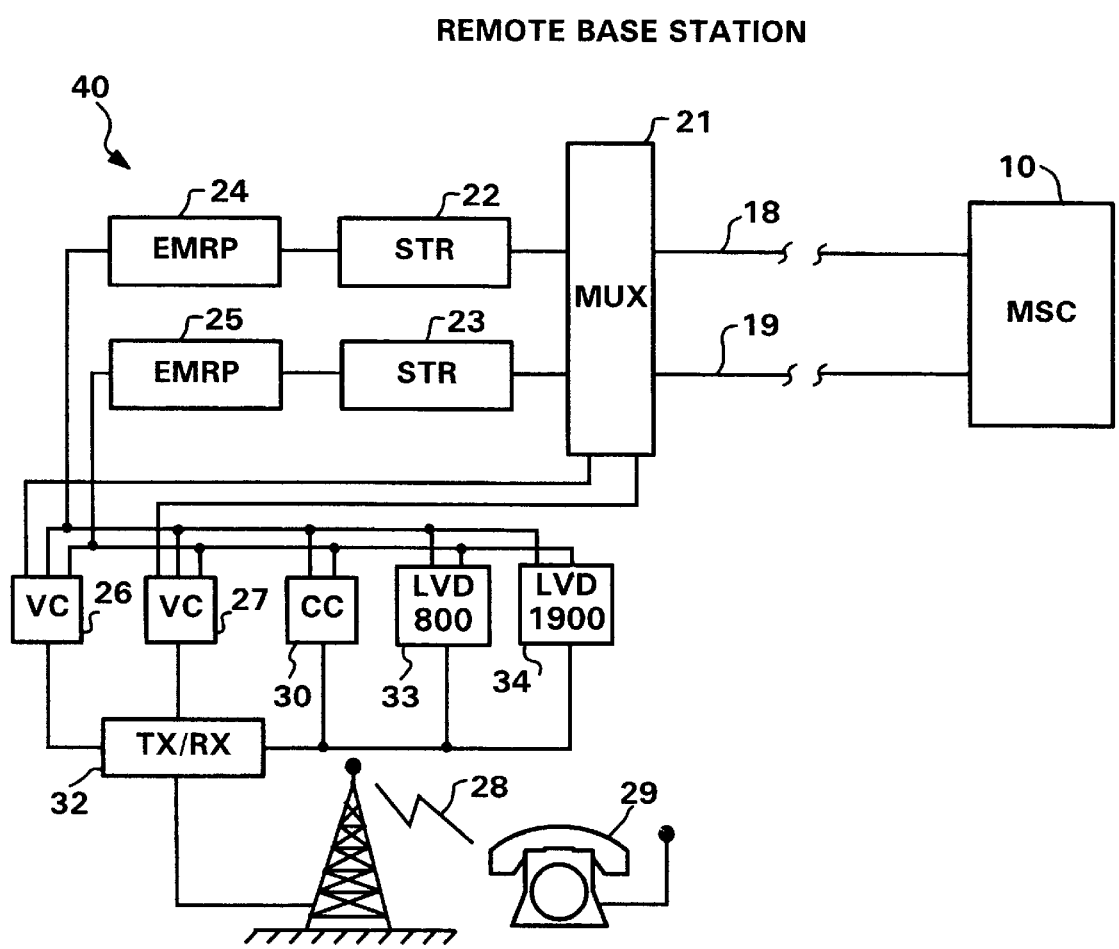
FIG. 3 is a high level block diagram of a remote base station modified in accordance with the teachings of the present invention.

FIG. 3 is a high level block diagram of a remote base station 40 modified in accordance with the teachings of the present invention. The present invention provides interoperability between multiple cell entities operating in multiple frequency hyperbands in the same MSC by providing a location and verification device for each of the multiple hyperbands being utilized. In the exemplary network described herein, a single MSC controls both 800-MHz and 1900-MHz cells. Therefore, two location and verification devices (LVDs) 33 and 34 are provided.

The primary modes of operation of each mobile station are an idle operating mode and an on-call (busy) operating mode. In the idle operating mode, the mobile station stands by and awaits the receipt or initiation of a cellular telephone call, data delivery, short message service (SMS) delivery, or other orders. In the busy operating mode, the mobile station is being actively utilized by the subscriber to engage in a cellular telephone communication. While in the idle operating mode, the mobile station receives a list of neighboring cells (neighbor list) from the MSC via a communication that is broadcast from the serving base station. The neighbor list identifies neighboring cells (i.e., other base stations) that are available for cell reselection when the mobile station moves through the service area and passes across cell boundaries.

Location, Presence Verification, and Handoff are three procedures required to hand over an ongoing call from cell to cell while maintaining high signal quality as a mobile station moves around in a cellular network. The purpose of the Location function is to find the cell with the best radio reception characteristics for a specific mobile station. The purpose of the Presence Verification function is to verify the presence of the mobile station in the new cell prior to handoff. The purpose of the Handoff function is to safely transfer an ongoing call from one cell to another that, according to the Location function, is better suited to handle the call. Handoffs can also be conducted within the same cell to another channel or to and from an overlaid cell such as between a 800-MHz cell and an overlaid 1900-MHz cell.

In the busy operating mode, there are two alternative methods of providing seamless interoperability, one method which utilizes mobile assisted handoff (MAHO) to perform the Location function and to identify when a handoff should be initiated, and one method which does not utilize MAHO.
Location Utilizing MAHO For those networks that utilize MAHO, the mobile station performs the Location function. In the preferred embodiment, MAHO is utilized, and the mobile station receives on a dedicated channel, a neighbor list identifying neighboring cells from which the mobile station is to measure the signal strength. The mobile station measures the quality of the connection by measuring the bit error rate and the received signal strength on its assigned channel. The mobile station also measures the signal strength of channels in neighboring cells indicated in a Measurement Order from the base station. The Measurement Order includes measurement channels in neighboring cells. The channels are then ranked according to the signal strength received at the mobile station. These signal strength measurements are then utilized to assist the network in making a handoff determination and to identify the best candidate cell for handoff.

The capability of each mobile station to operate in the 800-MHz hyperband and the 1900-MHz hyperband is known to both the mobile station and the MSC. Those mobile stations that are not multi-hyperband capable are presented with neighbor lists that include only cells operating in the frequency hyperband in which the mobile stations are capable of communicating. For example, when a 800-MHz only mobile station is recognized, the MSC sends a neighbor list containing only 800-MHz neighbor cells. When a multi-hyperband capable mobile station is recognized, and the cellular network has cells that operate in both hyperbands, the MSC sends a different neighbor list to the mobile station that includes both 800-MHz and 1900-MHz neighbor cells. The network operator may exclude, at the operator's discretion, some cells from the neighbor list. Thus, with the present invention, the operator has distinct control over the utilization of the mobile station's capabilities within the network.

When a mobile station in idle mode operates on a digital control channel (DCC) in a cellular network, the serving MSC transmits the neighbor list over the DCC to the mobile station. When the mobile station is in the busy mode, the measurement order is broadcast over the digital traffic channel to the mobile station at call setup and handoff. The mobile station continuously measures between bursts, the received signal strength from each of the measurement channels in the cells specified in the neighbor list. If, for example, the mobile station is utilizing the first time slot for voice communications, it may utilize the second and third time slots for obtaining signal strength measurements from neighbor cells. This information is then compared to network criteria to make the handoff determination and to identify the best candidate cell for handoff.

When utilizing MAHO, the serving base station receives channel quality messages of its neighboring cells from the mobile station and compares the channels with each other. The base station considers received signal strength and propagation path loss (transmitted power level minus received signal strength). Parameters in the base station determine whether a request for handoff should be sent to the MSC.
Location Without Utilizing MAHO In cellular networks that do not utilize MAHO to assist in the handoff process, then location and verification devices perform the base station's portion of both the Location and Presence Verification functions. The location and verification devices are deployed in base stations throughout the network for measuring signal strengths from mobile stations in conversation state in neighboring cells. The location and verification devices in a particular base station operate on each hyperband operated by that base station and its neighbor cells. Implementation may be as a plurality of location and verification devices, each operating on a different neighboring hyperband, or as a single location and verification device that is capable of independently measuring received signal strength on a plurality of different hyperbands. The signal strength measurements are provided to the MSC which determines the best candidate cell for handoff.

Since the embodiment described herein operates in the 800-MHz hyperband and the 1900-MHz hyperband, two location and verification devices are provided to perform mobile station Location and Presence Verification independently in the 800-MHz hyperband and the 1900-MHz hyperband. If a multi-hyperband capable mobile station is operating in an 800-MHz cell, the present invention determines whether a different 800-MHz cell or a 1900-MHz cell would make a better serving cell or handoff candidate, and then verifies the presence of the mobile station in the candidate cell prior to cell reselection or handoff. This determination is made even though the propagation characteristics of 800-MHz and 1900-MHz cells are different.

Presence Verification

In the preferred embodiment, the location and verification devices are utilized to perform a process known as Presence Verification following the Location process and prior to handoff in order to verify the presence of the mobile station in the cell which has been designated as the best candidate cell for handoff. A final signal strength measurement of the mobile station's signal is made in the candidate handoff cell, and if the signal strength exceeds a predetermined threshold, the handoff is initiated. Presence verification may be performed with or without the use of MAHO to perform the location function.

Presence Verification is performed in the base station on order from the MSC. When operating on a digital traffic channel, the base station in the candidate cell for handoff is given the mobile station's old channel number, rate, time slot, and digital verification color code (DVCC), and is ordered to verify the mobile station's presence on the old channel. The base station measures the signal strength of the mobile station's signal on the old channel utilizing its location and verification device, decodes the DVCC to verify the mobile station's identity, and performs a comparison of the uplink and downlink signal strengths. When operating on an analog voice channel, signal strength is measured on the voice channel for the serving channel Supervisory Audio Tone (SAT). This information is reported to the MSC.

Figure 4:
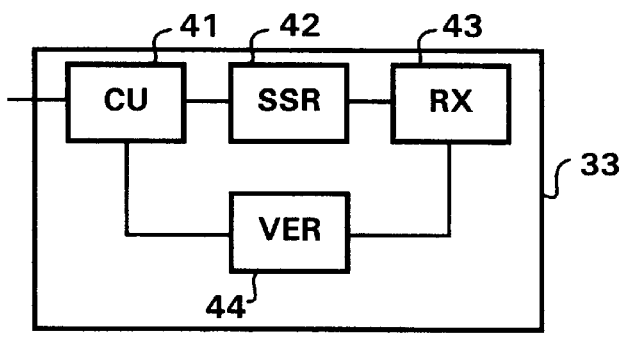
FIG. 4 is a high level block diagram of a first embodiment of the location and verification device of FIG. 3 which performs both cyclical location measurements as well as a verification signal strength measurement on demand.

FIG. 4 is a high level block diagram of a first embodiment of a location and verification device 33 which performs both the cyclical location measurements as well as the verification signal strength measurement on demand. Each location and verification device comprises a control unit (CU) 41, a signal strength receiver (SSR) 42, a receiver (RX) 43, and a verification device (VER) 44. The location and verification device 33 utilizes the SSR 42 to perform cyclical sampling measurements of radio signals received from mobile stations operating on voice channel frequencies allocated to neighboring cells. The results of the sampling measurements are updated in the CU 41 as a mean value (also considering previous measurements) after each sampling cycle. This mean value is provided to neighboring cells upon request in order to ascertain whether the cell operating the location and verification device 33 is a good candidate cell for handoff.

When the location and verification device is requested to perform a verification measurement, the CU 41 may interrupt the cyclical measurements by the SSR 42 for the VER 44 to perform the signal strength measurement.

Figure 5:
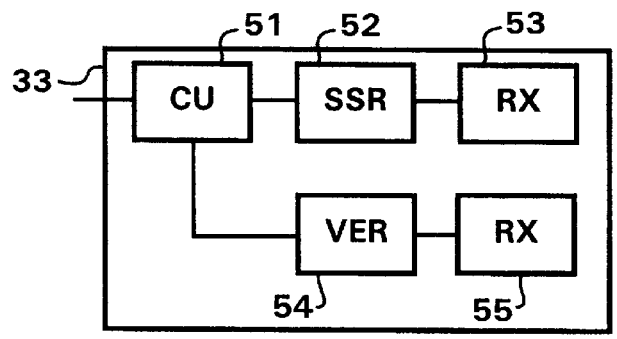
FIG. 5 is a high level block diagram of a second embodiment of the location and verification device of FIG. 3 which performs both cyclical location measurements as well as a verification signal strength measurement on demand.

FIG. 5 is a high level block diagram of a second embodiment of a location and verification device 33 which performs both the cyclical location measurements as well as the verification signal strength measurement. Once again, the location and verification device comprises a control unit (CU) 51, a signal strength receiver (SSR) 52, a receiver (RX) 53, and a verification device (VER) 54. However, a second receiver 55 is added to the signal path for the verification function. The second receiver 55 and VER 54 may then perform the signal strength measurement for the verification function without interrupting the cyclical measurements of the SSR 52.

Figure 6:
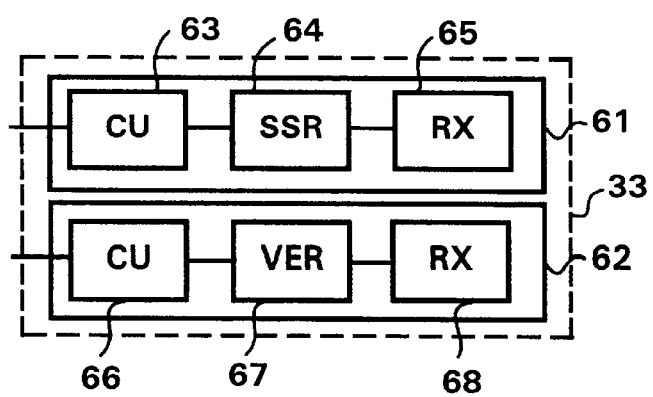
FIG. 6 is a high level block diagram of a third embodiment of the location and verification device of FIG. 3 which performs both cyclical location measurements as well as a verification signal strength measurement on demand.

FIG. 6 is a high level block diagram of a third embodiment of a location and verification device 33 which performs both the cyclical location measurements as well as the verification signal strength measurement. In this embodiment, the location and verification device 33 is divided into a location component 61 and a verification component 62 which are functionally independent. The location component includes a control unit (CU) 63, a signal strength receiver (SSR) 64, and a receiver (RX) 65. The verification component 62 includes a control unit (CU) 66, a verification device (VER) 67, and a receiver (RX) 68. The verification component 62 then performs the signal strength measurement for the verification function without interrupting the cyclical measurements of the location component 61.

By installing location and verification devices 33 and 34 (FIG. 3) operating at 800 MHz and 1900 MHz respectively, the present invention also enables handoff between a 800-MHz cell and a 1900-MHz cell operated by the same base station and MSC. The same procedures are followed as if handing off from one 800-MHz cell to a neighboring 800-MHz cell. When the signal strength received at the base station on one frequency significantly exceeds the signal strength received on the other frequency, then a handoff to the stronger cell is initiated. In this way, the present invention provides the capability to define multiple cell entities operating in different frequency hyperbands within the same MSC service area, and have interoperability between them.

It is thus believed that the operation and construction of the present invention will be apparent from the foregoing description. While the system shown and described has been characterized as operating on two hyperbands (800 MHz and 1900 MHz), it should be recognized that the present invention may also operate in other frequency hyperbands and in greater numbers of frequency hyperbands. Thus, it will be readily apparent that various changes and modifications could be made therein without departing from the spirit and scope of the invention as defined in the following claims.

What is claimed is:

1. A system for providing seamless interoperability for mobile stations capable of operating in a first hyperband, mobile stations capable of operating in a second hyperband, and multi-hyperband capable mobile stations, each such mobile station roaming between cells within a cellular telecommunications network having a mobile switching center and a plurality of frequency hyperbands, said system comprising:

a serving cell in which said mobile station is operating, said serving cell having a serving base station;

means for building a neighbor list of cells neighboring said serving cell, wherein if said mobile station is one capable of operation in said first hyperband, including neighbor cells operating in the first hyperband, if said mobile station is one capable of operation in said second hyperband, including neighbor cells operating in the second hyperband, and if said mobile station is one that is multi-hyperband capable, said neighbor list including neighbor cells operating in frequency hyperbands supported by said multi-hyperband capable mobile station;

means for measuring signal strengths in each of said plurality of frequency hyperbands between said mobile station and said serving base station, and between said mobile station and said cells in said neighbor list;

means for determining the best candidate cell for communication with said mobile station; and means for handing off said mobile station to said best candidate cell for communication with said mobile station.

2. The system for providing seamless interoperability of claim 1 further comprising means for verifying that said mobile station is present in said best candidate cell for communication with said mobile station prior to handing off said mobile station.

3. The system for providing seamless interoperability of claim 2 wherein said means for measuring signal strengths in each of said plurality of frequency hyperbands between said mobile station and said serving base station, and between said mobile station and said cells in said neighbor list includes a location and verification device that measures signal strengths in said plurality of frequency hyperbands.

4. The system for providing seamless interoperability of claim 2 wherein said means for measuring signal strengths in each of said plurality of frequency hyperbands between said mobile station and said serving base station, and between said mobile station and said cells in said neighbor list includes a plurality of location and verification devices within each of said plurality of base stations, each of said plurality of location and verification devices operating in a different one of said plurality of frequency hyperbands.

5. The system for providing seamless interoperability of claim 2 wherein said means for measuring signal strengths in each of said plurality of frequency hyperbands between said mobile station and said serving base station, and between said mobile station and said cells in said neighbor list includes means within said mobile station for measuring said signal strengths.

6. The system for providing seamless interoperability of claim 5 further comprising means within said mobile switching center for requesting said mobile station to measure said signal strengths.

7. The system for providing seamless interoperability of claim 6 further comprising means within said mobile station for reporting said measured signal strengths to said serving base station.

8. The system for providing seamless interoperability for a mobile station of claim 2 wherein said means for building a neighbor list includes:

means for determining the frequency hyperbands in which said mobile station is capable of communicating; and means for selectively building a neighbor list that includes only cells operating in said frequency hyperbands in which said mobile station is capable of communicating.

9. The system for providing seamless interoperability for a mobile station of claim 8 further comprising means for providing said neighbor list to said mobile station.

10. The system for providing seamless interoperability for a mobile station of claim 9 wherein said means for determining the best candidate cell for communication with said mobile station includes means for identifying a cell with the best radio reception characteristics for said mobile station.

11. The system for providing seamless interoperability for a mobile station of claim 10 wherein said means for identifying a cell with the best radio reception characteristics for said mobile station includes means within said mobile station for measuring signal strength and bit error rate on said mobile station's assigned radio channel.

12. The system for providing seamless interoperability for a mobile station of claim 10 wherein said means for identifying a cell with the best radio reception characteristics for said mobile station includes means within said serving base station and said cells in said neighbor list for measuring signal strength and bit error rate on said mobile station's assigned radio channel.

13. The system for providing seamless interoperability for a mobile station of claim 12 wherein said means for identifying a cell with the best radio reception characteristics for said mobile station includes means for comparing each of said measured signal strengths with predetermined parameters to determine whether to hand off said mobile station to an identified cell.

14. The system for providing seamless interoperability of claim 13 wherein said means for verifying that said mobile station is present in said best candidate cell for communication with said mobile station prior to handing off said mobile station includes:

means for measuring the signal strength of the mobile station's signal in said best candidate cell; and means for receiving a supervisory audio tone (SAT) to verify the mobile station's identity.

15. The system for providing seamless interoperability of claim 13 wherein said means for verifying that said mobile station is present in said best candidate cell for communication with said mobile station prior to handing off said mobile station includes:

means for measuring the signal strength of the mobile station's signal in said best candidate cell; and means for decoding a digital verification color code (DVCC) to verify the mobile station's identity.

16. The system for providing seamless interoperability of claim 15 wherein said means for measuring the signal strength of the mobile station's signal in said best candidate cell includes means for utilizing said location and verification devices to measuring the signal strength of the mobile station's signal in said best candidate cell.

17. The system for providing seamless interoperability of claim 16 wherein said location and verification devices include means for measuring the signal strength of the mobile station's signal for purposes of presence verification independently of measuring the signal strength of the mobile station for purposes of identifying a cell with the best radio reception characteristics for said mobile station.

18. The system for providing seamless interoperability of claim 1 wherein said plurality of frequency hyperbands includes an 800-MHz cellular telephone frequency hyperband and a 1900-MHz personal communication services (PCS) frequency hyperband.

19. A method of providing seamless interoperability for mobile stations capable of operating in a first hyperband, mobile stations capable of operating in a second hyperband, and for multi-hyperband capable mobile stations, each mobile station roaming between cells within a cellular telecommunications network having a mobile switching center and a plurality of base stations that transmit and receive radio signals in a plurality of frequency hyperbands, said method comprising the steps of:

operating a plurality of location and verification devices within each of said plurality of base stations, each of said plurality of location and verification devices operating in a different one of said plurality of frequency hyperbands;

for each base station, building a neighbor list of neighbor cells that includes cells operating in different ones of said plurality of frequency hyperbands;

identifying the best candidate cell for communication with said mobile station, wherein if said mobile station is one that is capable of operating in said first frequency hyperband, said best candidate cell is selected from a neighbor list having only cells operating in said first frequency hyperband, if said mobile station is one that is capable of operating in said second frequency hyperband, said best candidate cell is selected from a neighbor list having only cells operating in said second frequency hyperband, and if said mobile station is one that is multi-hyperband capable, said best candidate cell is selected from a neighbor list having cells capable of operating in either said first frequency hyperband or said second frequency hyperband;

determining whether said mobile station is in said best candidate cell; and handing off said mobile station to said best candidate cell upon determining that said mobile station is in said best candidate cell.

20. The method of providing seamless interoperability for a mobile station of claim 19 wherein said step of operating a plurality of location and verification devices within each of said plurality of base stations includes operating a plurality of location and verification devices, each of which includes a signal strength receiver tuned to a different one of said plurality of frequency hyperbands.

21. The method of providing seamless interoperability for a mobile station of claim 20 wherein said step of building a neighbor list includes the steps of:

determining the frequency hyperbands in which said mobile station is capable of communicating; and selectively building a neighbor list that includes only cells operating in said frequency hyperbands in which said mobile station is capable of communicating.

22. The method of providing seamless interoperability for a mobile station of claim 21 further comprising the step of providing said neighbor list to said mobile station.

23. The method of providing seamless interoperability for a mobile station of claim 22 wherein said step of identifying the best candidate cell for communication with said mobile station includes identifying a cell with the best radio reception characteristics for said mobile station.

24. The method of providing seamless interoperability for a mobile station of claim 23 wherein said step of identifying a cell with the best radio reception characteristics for said mobile station includes measuring within said mobile station, a signal strength and bit error rate on said mobile station's assigned radio channel.

25. The method of providing seamless interoperability for a mobile station of claim 24 wherein said step of identifying a cell with the best radio reception characteristics for said mobile station includes measuring a signal strength of a signal from said mobile station received in said neighboring cells.

26. The method of providing seamless interoperability for a mobile station of claim 24 wherein said step of identifying a cell with the best radio reception characteristics for said mobile station includes sending a measurement order to said mobile station ordering said mobile station to measure signal strengths of radio channels in said neighboring cells.

27. The method of providing seamless interoperability for a mobile station of claim 26 wherein said step of identifying a cell with the best radio reception characteristics for said mobile station includes comparing each of said measured signal strengths with predetermined parameters to determine whether to hand off said mobile station to an identified cell.

28. A method of providing seamless interoperability for mobile stations capable of operating in a first hyperband, mobile stations capable of operating in a second hyperband, and for a multi-hyperband capable mobile stations, each mobile station roaming between cells within a cellular telecommunications network having a mobile switching center and a plurality of base stations that transmit and receive radio signals in a plurality of frequency hyperbands, said method comprising the steps of:

designating a cell in which said mobile station is operating as a serving cell, said serving cell having a serving base station;

building a neighbor list of cells that neighbor said serving cell, said neighbor cells including cells operating in frequency hyperbands supported by said multi-hyperband capable mobile station;

measuring signal strengths in each of said plurality of frequency hyperbands between said mobile station and said serving base station, and between said mobile station and said cells in said neighbor list;

determining the best candidate cell for communication with said mobile station, wherein if said mobile station is one that is capable of operating in said first frequency hyperband, said best candidate cell is selected from a neighbor list having only cells operating in said first frequency hyperband, if said mobile station is one that is capable of operating in said second frequency hyperband, said best candidate cell is selected from a neighbor list having only cells operating in said second frequency hyperband, and if said mobile station is one that is multi-hyperband capable, said best candidate cell is selected from a neighbor list having cells capable of operating in either said first frequency hyperband or said second frequency hyperband; and handing off said mobile station to said best candidate cell for communication with said mobile station.

29. The method of providing seamless interoperability of claim 28 further comprising the step of verifying that said mobile station is present in said best candidate cell for communication with said mobile station prior to handing off said mobile station.

30. The method of providing seamless interoperability of claim 29 wherein said step of measuring signal strengths in each of said plurality of frequency hyperbands between said mobile station and said serving base station, and between said mobile station and said cells in said neighbor list includes the step of measuring signal strengths in said plurality of frequency hyperbands with a location and verification device.

31. The method of providing seamless interoperability of claim 29 wherein said step of measuring signal strengths in each of said plurality of frequency hyperbands between said mobile station and said serving base station, and between said mobile station and said cells in said neighbor list includes the step of measuring signal strengths in said plurality of frequency hyperbands with a plurality of location and verification devices within each of said plurality of base stations, each of said plurality of location and verification devices operating in a different one of said plurality of frequency hyperbands.

32. The method of providing seamless interoperability of claim 29 wherein said step of measuring signal strengths in each of said plurality of frequency hyperbands between said mobile station and a serving base station, and between said mobile station and said cells in said neighbor list of candidate cells for handoff includes the step of measuring said signal strengths within said mobile station.

33. The method of providing seamless interoperability of claim 32 further comprising the step of sending a message from said mobile switching center to said mobile station, said message requesting said mobile station to measure said signal strengths.

34. The method of providing seamless interoperability of claim 33 further comprising the step of sending a message from said mobile station to said serving base station, said message reporting said measured signal strengths to said serving base station.

35. The method of providing seamless interoperability for a mobile station of claim 29 wherein said step of building a neighbor list includes:
 determining the frequency hyperbands in which said mobile station is capable of communicating; and
 selectively building a neighbor list that includes only cells operating in said frequency hyperbands in which said mobile station is capable of communicating.

36. The method of providing seamless interoperability for a mobile station of claim 35 further comprising the step of providing said neighbor list to said mobile station.

37. The method of providing seamless interoperability for a mobile station of claim 36 wherein said step of determining the best candidate cell for communication with said mobile station includes the step of identifying a cell with the best radio reception characteristics for said mobile station.

38. The method of providing seamless interoperability for a mobile station of claim 37 wherein said step of identifying a cell with the best radio reception characteristics for said mobile station includes the step of measuring within said mobile station, signal strength and bit error rate on said mobile station's assigned radio channel.

39. The method of providing seamless interoperability for a mobile station of claim 37 wherein said step of identifying a cell with the best radio reception characteristics for said mobile station includes the step of measuring within said serving base station and within said cells in said neighbor list, signal strength and bit error rate on said mobile station's assigned radio channel.

40. The method of providing seamless interoperability for a mobile station of claim 39 wherein said step of identifying a cell with the best radio reception characteristics for said mobile station includes the step of comparing each of said measured signal strengths with predetermined parameters to determine whether to hand off said mobile station to an identified cell.

41. The method of providing seamless interoperability of claim 40 wherein said step of verifying that said mobile station is present in said best candidate cell for communication with said mobile station prior to handing off said mobile station includes:
 measuring the signal strength of the mobile station's signal in said best candidate cell; and
 receiving a supervisory audio tone (SAT) to verify the mobile station's identity.

42. The method of providing seamless interoperability of claim 40 wherein said step of verifying that said mobile station is present in said best candidate cell for communication with said mobile station prior to handing off said mobile station includes:
 measuring the signal strength of the mobile station's signal in said best candidate cell; and
 decoding a digital verification color code (DVCC) to verify the mobile station's identity.

43. The method of providing seamless interoperability of claim 42 wherein said step of measuring the signal strength of the mobile station's signal in said best candidate cell includes the step of utilizing said location and verification devices to measuring the signal strength of the mobile station's signal in said best candidate cell.

44. The method of providing seamless interoperability of claim 42 wherein said step of utilizing said location and verification devices to measuring the signal strength of the mobile station's signal in said best candidate cell includes measuring the signal strength of the mobile station's signal for purposes of presence verification independently of measuring the signal strength of the mobile station's signal for purposes of identifying a cell with the best radio reception characteristics for said mobile station.

45. The method of providing seamless interoperability of claim 28 wherein said step of measuring signal strengths in each of said plurality of frequency hyperbands between said mobile station and a serving base station, and between said mobile station and said cells in said neighbor list of candidate cells for handoff includes measuring signal strengths in an 800-MHz cellular telephone frequency hyperband and in a 1900-MHz personal communication services (PCS) frequency hyperband.

* * * * *